(12) United States Patent
McCloskey

(10) Patent No.: US 8,027,468 B2
(45) Date of Patent: Sep. 27, 2011

(54) METHOD AND SYSTEM FOR CAMERA SENSOR FINGERPRINTING

(75) Inventor: Scott McCloskey, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 778 days.

(21) Appl. No.: 12/099,591

(22) Filed: Apr. 8, 2008

(65) Prior Publication Data
US 2009/0251555 A1 Oct. 8, 2009

(51) Int. Cl.
*H04N 7/167* (2011.01)
*H04L 9/32* (2006.01)
*G06K 9/00* (2006.01)

(52) U.S. Cl. ......... 380/200; 713/176; 713/179; 382/100
(58) Field of Classification Search .......................... None
See application file for complete search history.

(56) References Cited

U.S. PATENT DOCUMENTS

| | | | |
|---|---|---|---|
| 5,499,294 A * | 3/1996 | Friedman | 713/179 |
| 7,129,973 B2 | 10/2006 | Raynor | |
| 7,603,559 B2 * | 10/2009 | Roberts et al. | 713/176 |
| 2003/0123700 A1* | 7/2003 | Wakao | 382/100 |
| 2008/0036863 A1* | 2/2008 | Esbensen | 348/159 |
| 2008/0276095 A1* | 11/2008 | Iwamura | 713/179 |

\* cited by examiner

*Primary Examiner* — Shin-Hon Chen
(74) *Attorney, Agent, or Firm* — Schwegman, Lundberg & Woessner P.A.

(57) ABSTRACT

Some embodiments of the application provides methods and systems for providing camera fingerprinting by receiving a video frame from a camera, generating a confidence map based on an image characteristic associated with the video frame, generating a signature based on a sensor imperfection in the camera, weighting the signature based on the confidence map for each frame and generating a key based on the weighted signature over the plurality of video frames received. Other methods and systems are disclosed.

21 Claims, 3 Drawing Sheets

METHOD AND SYSTEM FOR CAMERA SENSOR FINGERPRINTING

TECHNICAL FIELD

The present application relates generally to camera sensors and in particular to Closed-Circuit Television (CCTV) surveillance systems.

BACKGROUND

Closed-Circuit Television (CCTV) surveillance systems can be prone to a number of attacks. Attackers may be able to spoof the surveillance systems by injecting false video data into the system in place of the video from a CCTV camera. This concern is heightened for CCTV systems that employ wireless links for individual cameras, as it can be easier to inject false video data into the system.

BRIEF DESCRIPTION OF THE DRAWINGS

Some embodiments are illustrated by way of examples, and not by way of limitations, in the figures of the accompanying drawings in which.

DETAILED DESCRIPTION

Figure 1:
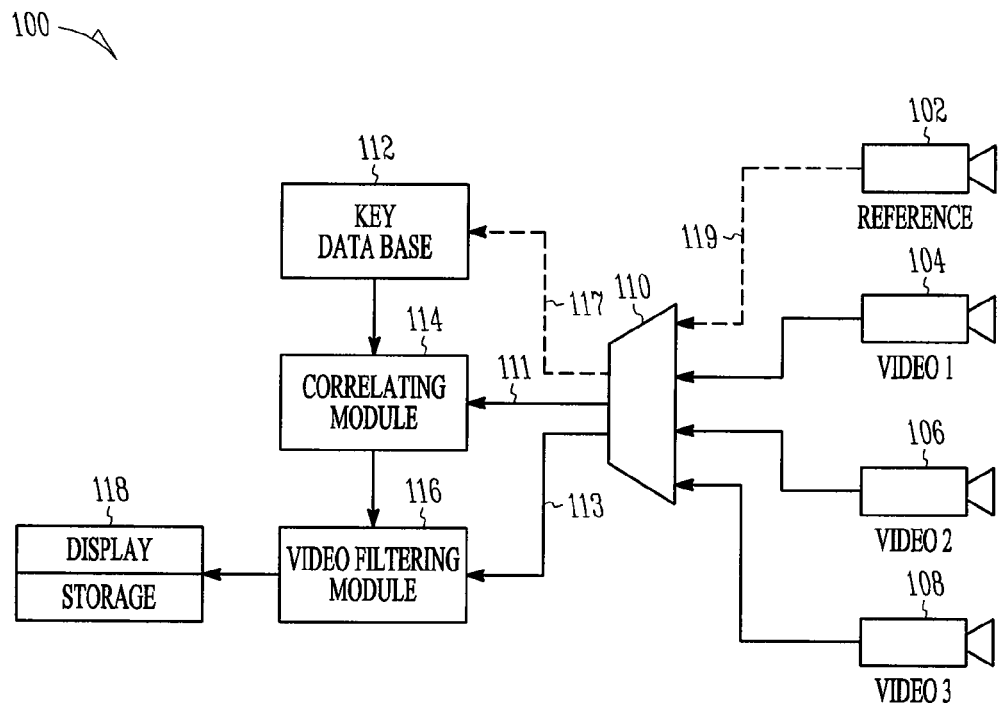
FIG. 1 is a block diagram of CCTV surveillance system, according to an example embodiment.

In the following description, for purposes of explanation, numerous specific details are set forth in order to provide a thorough understanding of example embodiments. The following detailed description includes reference to the accompanying drawings, by way of illustration, specific embodiments in which the invention may be practiced. The embodiments may be combined, other embodiments may be utilized, or structural, logical and electrical changes may be made without departing from the scope of the present invention. The following detailed description is, therefore not to be taken in the limiting sense, and the scope of the present invention is defined by the appended claims and their equivalents. It will be evident, however, to one skilled in the art that the embodiments of the application may be practiced without these specific details.

In this document, the terms "a" or "an" are used, as is common in patent documents, to include one or more than one. In this document, the term "or" is used to refer to a nonexclusive or, unless otherwise indicated.

The functions or algorithms described herein may be implemented in software or a combination of software, hardware and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A system and method are provided for camera sensor fingerprinting of incoming video data in closed circuit surveillance systems. In order to be robust against attacks on CCTV surveillance systems, there is a need in the art to validate incoming video data. A camera sensor can include a number of pixels, typically ranging from 100,000 pixels for WebCam or low-quality TV to 16 mega-pixels for a high-end digital still camera. Camera sensors (for example, charge coupled devices (CCD) or complementary metal-oxide-semiconductors (CMOS) chips) have material and manufacturing imperfections that are unique, and signatures based on these imperfections can be used to discriminate between data coming from two cameras of the same make and model. Due to material properties and the various manufacturing processes that each camera sensor undergoes, each camera sensor includes pixels at particular locations that are imperfect when compared to the remaining pixels. Once a camera sensor has been manufactured, it is impossible to alter the location of imperfect pixels at unique locations without overtly damaging the pixels of the camera sensors. In some embodiments, various signatures or keys are generated based on distinct locations of imperfect pixels. In some embodiments, the generated signatures or keys may be used to identify a particular camera sensor for its authenticity when video images from the camera sensor are received by a fingerprinting system that is described herein. Moreover, due to the material properties and manufacturing processes, different pixels on the sensor will have different sensitivities to light, each within some tolerance level.

FIG. 1 is a block diagram of CCTV surveillance system 100, according to an example embodiment. Surveillance System 100 includes a video fingerprinting apparatus 110 configured to receive input video frames from a cameras 102, 104, 106 and 108. Cameras 102, 104, 106 and 108 include camera sensors that convert received input images into digital video frames which are provided to fingerprinting apparatus 110. In some embodiments, fingerprinting apparatus 110 is coupled to a key database 112, a correlating module 114, and a video filtering module 116 using links 117, 111 and 113, respectively. In some embodiments, the video filtering module 116 is coupled to display 118 having a storage module 118.

In some embodiments, each of the cameras 104, 106 and 108 are sequentially coupled to finger printing apparatus 110 as reference camera 102 in order to facilitate individual characterization of the camera sensors within cameras 104, 106 and 108. In some embodiments, a sample set of video frames from cameras 104, 106 and 108 are captured for individual characterization of the camera sensors when these cameras are installed for the first time in the surveillance system 100. In some embodiments, signatures are derived from each of the camera sensors for cameras 104, 106 and 108 and are identified as reference signatures using fingerprinting apparatus 110 and stored in key database 112. In some embodiments, each of the cameras 104, 106 and 108 are coupled to link 119 to capture their individual signatures in order to store in the key database 112 using link 117. The captured individual signatures for cameras 104, 106 and 108 are stored in the key database 117 as reference signatures that can be used to compare with other signatures derived as video is gathered when the cameras 104, 106 and 108 are deployed in a video surveillance system.

In some embodiments, fingerprinting apparatus 110 decompresses video frames received from cameras 102, 104, 106 and 108. In some embodiments, finger printing apparatus generates partial signatures that are representative of the unique profiles of camera sensors that have imperfections in particular pixel locations that may be caused during the manufacturing process. In some embodiments, fingerprinting module 110 performs further processing of partial signatures generated for cameras 104, 106 and 108 prior to storing a unique key corresponding to each of cameras 104, 106 and 108 in key database 112.

In some embodiments, the cameras 102, 104, 106 and 108 are coupled to the fingerprinting apparatus 110 using a wireless link. In some embodiments, the cameras 102, 104, 106 and 108 are coupled to the finger printing apparatus 110 using a wired link. In some embodiments, the links 117 and 119 are provided using a wireless link. In some embodiments, the links 117 and 119 are provided using a wired link.

In some embodiments, correlating module 114 is configured to compare a key generated for video frames received from any of the cameras 104, 106 and 108 with the various reference keys stored in the key database 112. In some embodiments, the correlating module 114 sends a control signal to video filtering module 116 indicating whether the key generated for a particular set of video frames matches any of the stored reference keys. In some embodiments, if an exact match is determined for the generated key when compared to the list of reference keys in the key database 112, then the video filtering module 116 would relay the corresponding video frames to display or storage 118. In some embodiments, when there does not seem to be a match between the generated key with any of the stored reference keys, then the video filtering module would block the video frames from being displayed on display 118. In some embodiments, the video filtering module 116 is configured to send a signal to the display 118 to indicate that there is a mismatch between the generated keys and the stored reference keys.

Figure 2:
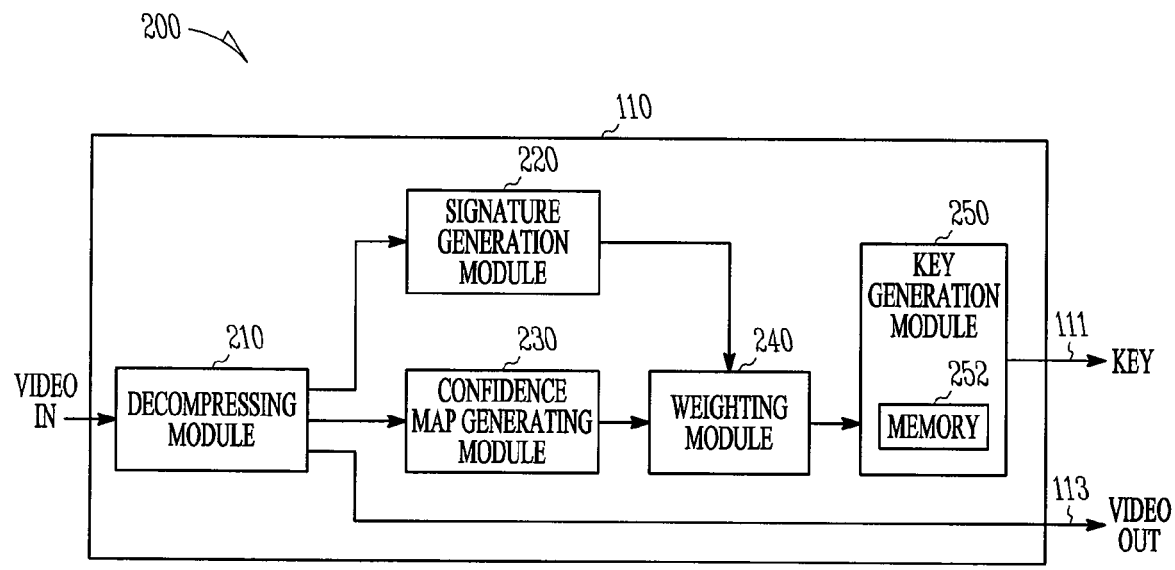
FIG. 2 is a block diagram of a video fingerprinting apparatus, according to an example embodiment.

FIG. 2 is a block diagram of a video fingerprinting apparatus 110 that is shown in FIG. 1, according to an example embodiment. In some embodiments, fingerprinting apparatus 110 includes a decompressing module 210, a signature generation module 220, a confidence map generating module 230, a weighting module 240, and a key generation module 250 having a memory 252. In some embodiments, the incoming video frames are provided to decompressing module 210 that is coupled to the signature module 220 and confidence map generating module 230 and link 113 that provides video out. In some embodiments, the signature generation module 220 and confidence map generating module 230 are coupled to the weighting module 240 that is coupled to the key generation module 250.

In some embodiments, the fingerprinting module 110 receives an input signal "VIDEO IN" and provides two outputs, a generated "KEY" on link 111 and "VIDEO OUT" on link 113. In some embodiments, the video signal "VIDEO IN" includes video frames and related meta-data, which are received and decompressed in decompressing module 210. In some embodiments, the metadata would include a gain and a flag indicating whether or not the frame is an intra-frame in the compressed stream. Because intra-frames are preserved at a higher quality in the compressed video stream, as is known to those skilled in the art, the confidence in the signatures extracted from them will be higher.

In some embodiments, the signature module 220 is configured to generate a signature representative of camera sensor imperfections. The signature generated by signature module 220 is received by the weighting module 240. In some embodiments, the confidence map generating module 230 is configured to generate a confidence map. In some embodiments, the confidence map is an array which is the same size as the image. Each entry in the confidence map indicates the relative confidence in the accuracy of the signature generation at the corresponding pixel location in the image. The relative confidence level can be represented within a scale having a range "0" to "1", with "0" indicating no confidence and "1" indicating very high confidence. In some embodiments, the confidence map generation module 230 is standardized using some controlled data to find an image metric that correlates with the accuracy of the output of the signature generation module 220. In some embodiments, the metric will be some combination of the following: magnitude of the image gradient, output of an edge detector, artifacts introduced by compression (JPEG/MPEG blocking), a global factor (i.e. indicative of the confidence in the entire frame) related to the gain, a global factor related to compression (whether the frame is an intra-frame). As is known to those skilled in the art, gradient magnitude is a simple measure of the degree of change in an image's intensity in a local neighborhood. Edge detectors, of which there are many forms, produce an output that indicates the presence of sharp changes in intensity in an image, as would be found e.g. at the boundary of an object. The gain is the amplification of the charge accumulated on the sensor as it is read out and converted to a digital representation; higher gain values will amplify some of the sensor imperfections that may form the basis for the signature, making the signature stronger in the high gain frames. Because intra-frames are preserved at a higher quality in the compressed video stream, they will be relatively more useful in signature extraction.

In some embodiments, the weighting module 240 receives the signature generated by the signature generation module 220 and performs a weighting function using the confidence map received from the confidence map generating module 230. The weighted signature from the weighting module 240 is received by the key generation module 250 which in turn generates a key representing the sensor imperfections of any of the cameras 104, 106 and 108.

Figure 3:
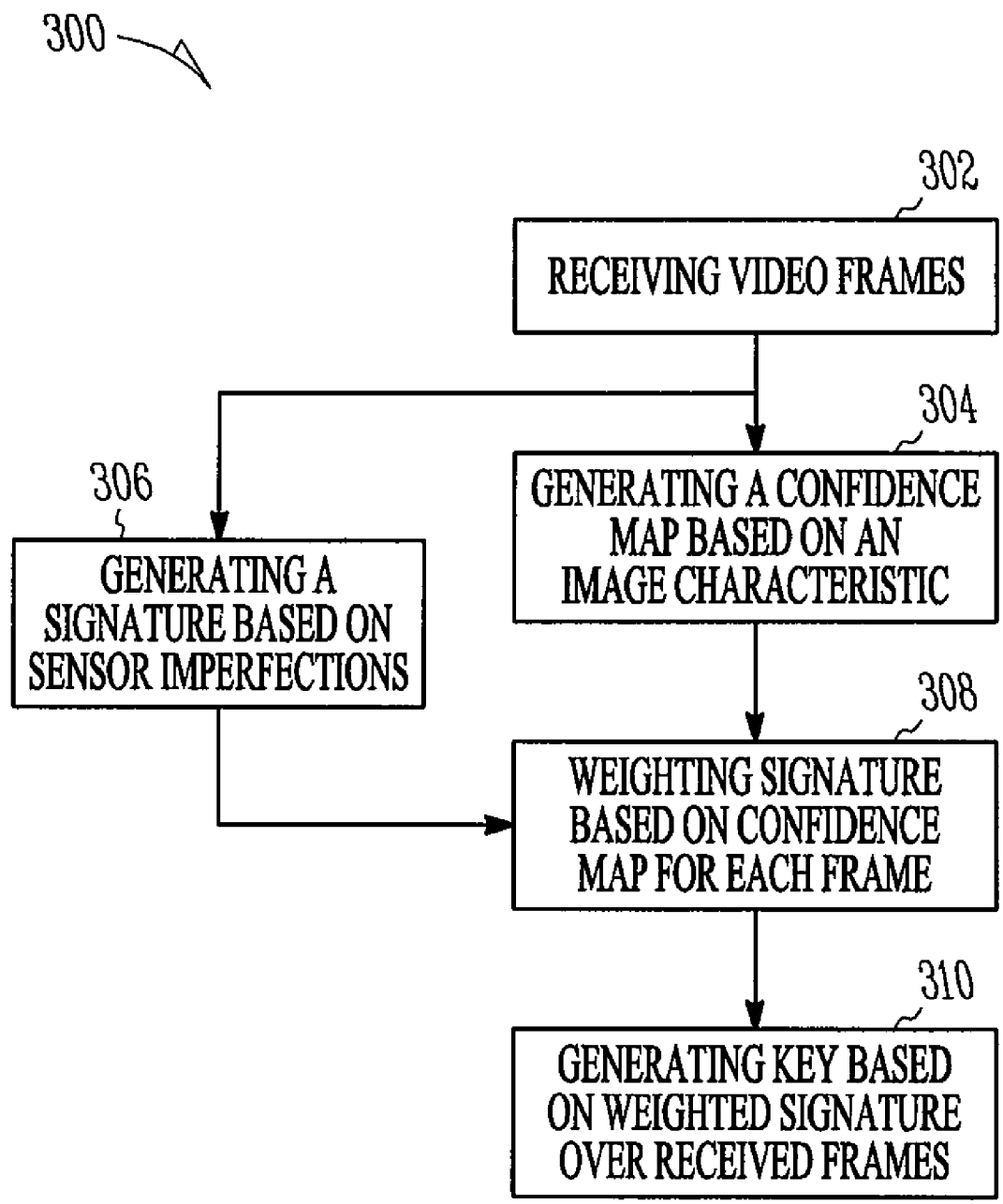
FIG. 3 is a flowchart illustrating a method of providing camera sensor fingerprinting for incoming video data in closed circuit surveillance systems, according to an example embodiment.

FIG. 3 is a flowchart illustrating a method 300 of providing camera sensor fingerprinting for incoming video data in closed circuit surveillance systems, according to an example embodiment. In some embodiments, method 300

At 302, method 300 includes receiving video frames at the video fingerprinting apparatus 112, according to some embodiments. In some embodiments, each of the cameras 104, 106 and 108 are connected to the fingerprinting apparatus in order to characterize the camera before being deployed in the closed circuit video surveillance system. In one embodiment, the camera is focused on a uniformly colored, plain surface while the fingerprinting apparatus 112 generates a key. The uniformly colored, plain surface is provided so as to have a relatively same input signal to be received at each of pixels in the camera sensor thereby allowing the fingerprinting apparatus to determine more accurately a key for the camera sensor. In some embodiments, a uniformly textured surface is provided as the image input to the cameras 104, 106 and 108 during the key generation process. In some embodiments, as each of the cameras are characterized in succession, their respective keys are stored in the key database 112. Upon loading all the keys in the key database 112, the cameras are deployed in the closed circuit surveillance system.

At 304, method 300 includes generating a confidence map based on an image characteristic received from a camera sensor. In some embodiments, the confidence map generation is performed using an edge detection algorithm which determines the various confidence levels for the values of individual pixels of the camera sensor. In some embodiments, generating a confidence map based on image characteristics associated with each video frame includes generating a confidence map that includes an array of elements, wherein each element represents a confidence value for a corresponding pixel of the video frame. In some embodiments, generating the confidence map includes generating a confidence map based on edge detection on images carried by the video frames. In some embodiments, generating the confidence map includes generating a confidence map based on texture detection on images carried by the video frames. In some embodiments, generating the confidence map for a frame includes providing a global scale factor based on an estimate of the gain used in the conversion of charge in the camera sensor to a digital representation of that frame. In some embodiments, generating the confidence map for a frame includes a providing a global scale factor based on the level of compression applied to that frame.

At 306, method 300 includes generating a signature based on sensor imperfections. In some embodiments, the components of the signature generated for a given camera includes dark noise, photo-response non-uniformity, readout smear, locations of defective pixels, the pattern of the sensor's color filter array (for color sensors), etc. In some embodiments, generating a signature includes generating a partial signature including an array of components, wherein each component in the array represents the sensitivity of the corresponding pixel. In some embodiments, each component in the array represents an indication of whether the corresponding pixel's sensitivity is either inside or outside a tolerance range.

At 308, method 300 includes weighting the generated signature based on the confidence map generated for each video frame received at block 302. In some embodiments, method 300 includes weighting the components of a partial signature derived at 306 using the corresponding elements in the confidence map generated for each of the plurality of video frames In some embodiments, an average value which is generated from a number of frames is used for weighting the generated signature.

At 310, method 300 includes generating key based on the weighted signature over received video frames. In some embodiments, method 300 includes comparing the generated key for a given image from a camera with stored keys in the key database 112. In some embodiments, if a particular key generated for an image frame does not match with any of the stored keys in key database 112, then the associated video frames are determined not to be from one of the cameras provided in the closed circuit surveillance system. In some embodiments, the key comparison task is performed in a correlating module 114. In some embodiments, the correlating module 114 performs a cross-correlation between two signatures or keys. In some embodiments, the correlating module 114 determines if the cross-correlation between two signatures or keys shows a high correlation or a low correlation. In some embodiments, a video filtering module 116 receives a signal from the correlating module 114 identifying whether or not a particular image frame is produced by one of the cameras in the surveillance system.

Figure 4:
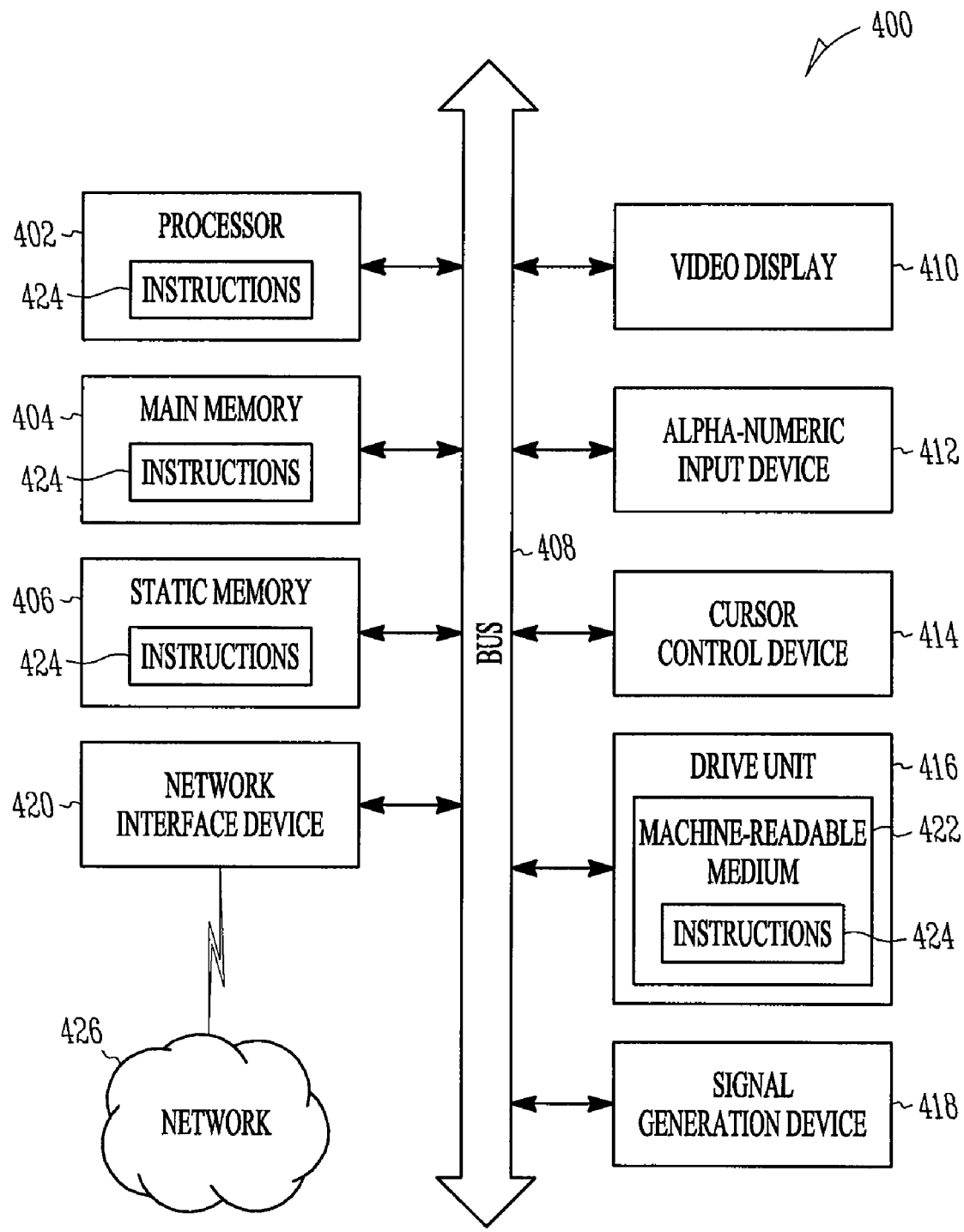
FIG. 4 is a block diagram illustrating a machine in the example form of a computer system 400, within which a set of sequence of instructions for screening video in a closed circuit surveillance system, according to some embodiments of the invention.

FIG. 4 is a block diagram of a machine in the example form of a computer system 400, within which a set of sequence of instructions for providing camera fingerprinting in a closed circuit video surveillance system, according to some embodiments.

In some embodiments, the computer system 400 may represent either fingerprinting apparatus 110, correlating module 114 or video filtering module 116 or some combination of 110, 112, 114 and 116. In some embodiments, the computer system 400 described herein may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions that specify actions to be taken by that machine. Further, while only a single machine is illustrated, the term "machine" shall also be taken to include any collection of machines that individually or jointly execute a set of instructions to perform any one or more of the methodologies discussed herein.

The example computer system 400 includes a processor 402 (e.g., a central processing unit (CPU) a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a camera sensor) and a network interface device 420. The disk drive unit 416 includes a computer-readable medium 422 on which is stored one or more sets of instructions (e.g., software 424) embodying any one or more of the methodologies or functions described herein. In some embodiments, the computer readable medium 422 is encoded with instructions, wherein the instructions when executed includes receiving video frames at the video fingerprinting apparatus 112, followed by generating a signature based on sensor imperfections and a confidence map based on an image characteristic. In some embodiments, the computer readable medium 422 is encoded with instructions, which when executed includes weighting the generated signature based on the confidence map generated for each video frame received at block 102.

The software 424 may also reside, completely or at least partially, within the main memory 404 and/or within the processor 402 during execution thereof by the computer system 400, the main memory 404 and the processor 402 also constituting machine-readable media. The software 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media.

The above-described steps can be implemented using standard programming techniques. The novelty of the above-described embodiment lies not in the specific programming techniques but in the use of the methods described to achieve the described results. Software programming code which embodies the present application is typically stored in permanent storage. In a client/server environment, such software programming code may be stored in storage associated with a server. The software programming code may be embodied on any of a variety of known media for use with a data processing system, such as a diskette, or hard drive, or CD ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

While there has been described herein the principles of the application, it is to be understood by those skilled in the art that this description is made only by way of example and not as a limitation to the scope of the application. Accordingly, it is intended by the appended claims, to cover all modifications of the application which fall within the true spirit and scope of the invention.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A method, comprising:
   receiving a plurality of video frames from a camera;
   generating a confidence map based on image characteristics associated with each video frame;
   generating a partial signature based on a sensor imperfection in the camera for each video frame;
   weighting components of the partial signature using the confidence map generated for each of the plurality of video frames; and
   generating a key based on weighted partial signatures of the video frames to authenticate images from the camera.

2. The method of claim 1, wherein generating a key includes generating a key based on averaging the weighted partial signatures over the plurality of video frames received.

3. The method of claim 1, further comprising:
   identifying the generated key as a reference key representing the camera and storing the reference key.

4. The method of claim 3, further comprising:
   generating a second key using a further plurality of video frames received from at least one of the camera and another camera; and
   comparing the second key with the stored reference key.

5. The method of claim 4, comprising:
   inhibiting the display or storage of the second plurality of video frames received from the camera.

6. The method of claim 1, wherein generating the confidence map for a frame includes generating a confidence map based on edge detection, the confidence map including an array of elements, wherein each element represents a confidence value for a corresponding pixel of the video frame.

7. The method of claim 1, wherein generating the confidence map for a frame includes generating a confidence map based on texture detection, the confidence map including an array of elements, wherein each element represents a confidence value for a corresponding pixel of the video frame.

8. The method of claim 1, wherein generating the confidence map for a frame includes providing a global scale factor based on an estimate of the gain used in the conversion of charge in the camera sensor to a digital representation of that frame.

9. The method of claim 1, wherein generating the confidence map for a frame includes a global scale factor based on the level of compression applied to that frame.

10. An apparatus comprising:
    a decompressing module to receive a plurality of video frames from a camera;
    a signature generation module coupled to the decompressing module to generate a partial signature based on a sensor imperfection in the camera;
    a confidence map generating module coupled to the decompressing module to generate a confidence map based on an image characteristic associated with each video frame;
    a weighting module to provide weighting of the partial signature based on confidence map for each frame; and
    a key generating module to generate a key based on the weighted partial signatures over the plurality of video frames received at the decompressing module to authenticate images from the camera.

11. The apparatus of claim 10, wherein the partial signature includes an array of components, each component in the array representing the sensitivity of the corresponding pixel.

12. The apparatus of claim 11, wherein the partial signature includes an array of components, each component in the array representing the corresponding pixel's sensitivity being at least one of inside a tolerance range and outside a tolerance range.

13. The apparatus of claim 10, wherein the confidence map generating module is configured to generate a confidence map based on edge detection.

14. The apparatus of claim 10, wherein the confidence map generating module is configured to generate a confidence map based on texture detection.

15. The apparatus of claim 10, wherein the confidence map generating module is configured to generate a confidence map having an overall magnitude for a frame that is based on an estimate of the gain used to convert the charge of the sensor to a digital representation of that frame.

16. The apparatus of claim 10, wherein the confidence map generating module is configured to generate a confidence map having an overall magnitude for a frame is based on the level of compression applied to that frame.

17. A computer readable storage device encoded with instructions, wherein the instructions when executed comprising:
    receiving a video frame from a camera;
    generating a confidence map based on an image characteristic associated with the video frame;
    generating a signature based on a sensor imperfection in the camera;

weighting the signature based on the confidence map for each frame; and generating a key based on the weighted signature over the plurality of video frames received to authenticate images from the camera.

18. The computer readable storage device of claim 17, wherein the instructions when executed, further comprising:

generating a confidence map based on edge detection.

19. The computer readable storage device of claim 17, wherein the instructions when executed, further comprising:

generating a confidence map based on texture detection.

20. The computer readable storage device of claim 17, wherein the instructions when executed, further comprising:

generating a second key using a further plurality of video frames received from said camera or another camera operating in a closed circuit television surveillance system; and comparing the second key with the stored reference key.

21. The computer readable storage device of claim 20, wherein the instructions when executed, further comprising:

inhibiting the display or storage of the second plurality of video frames received from the camera.

* * * * *